United States Patent [19]
Benett et al.

[11] Patent Number: 6,056,331
[45] Date of Patent: May 2, 2000

[54] ZERO DEAD VOLUME TUBE TO SURFACE SEAL

[75] Inventors: William J. Benett; James A. Folta, both of Livermore, Calif.

[73] Assignee: The Regents of the University of California, Oakland, Calif.

[21] Appl. No.: 08/711,841

[22] Filed: Sep. 12, 1996

[51] Int. Cl.$^7$ .................................................. F16L 21/04
[52] U.S. Cl. .................. 285/343; 285/353; 285/911; 285/334.4; 29/451
[58] Field of Search .................................. 285/911, 342, 285/343, 353, 334.4; 29/451

[56] References Cited

U.S. PATENT DOCUMENTS

| | | | |
|---|---|---|---|
| 4,690,437 | 9/1987 | Anderson | 285/911 X |
| 4,787,656 | 11/1988 | Ryder | 285/911 X |
| 5,163,722 | 11/1992 | Worden | 285/342 X |
| 5,288,113 | 2/1994 | Silvis et al. | 285/911 X |

FOREIGN PATENT DOCUMENTS

| | | | |
|---|---|---|---|
| 2729359 | 1/1978 | Germany | 285/342 |

*Primary Examiner*—Dave W. Arola
*Attorney, Agent, or Firm*—L. E. Carnahan; Alan H. Thompson

[57] ABSTRACT

A method and apparatus for connecting a tube to a surface that creates a dead volume seal. The apparatus is composed of three components, a body, a ferrule, and a threaded fitting. The ferrule is compressed onto a tube and a seal is formed between the tube and a device retained in the body by threading the fitting into the body which provides pressure that seals the face of the ferrule to a mating surface on the device. This seal can be used at elevated temperatures depending on the materials used. While the invention has been developed for use with micro-machined silicon wafers used in Capillary Gas Chromatograph (GC), it can be utilized anywhere for making a gas or fluid face seal to the surface of a device that has near zero dead volume.

14 Claims, 2 Drawing Sheets

ZERO DEAD VOLUME TUBE TO SURFACE SEAL

The United States Government has rights in this invention pursuant to Contract No. W-7405-ENG-48 between the United States Department of Energy and the University of California for the operation of Lawrence Livermore National Laboratory.

BACKGROUND OF THE INVENTION

The invention relates to fluidic connections, particularly to sealed for fluid connections to micro-machined devices, and more particularly to a zero dead volume tube-to-surface seal for fluidic connections, such as to micro-machined silicon wafers.

With the advent of micro-machined devices, making sealed fluidic connections to such devices has become an important technical issue in recent years because of the wide spread use of these types of devices.

The prior fluidic connections have primarily been made to the planar surface of the micro-machined devices, generally fabricated from silicon wafers. The common method for creating the ports on the surface of wafer devices is anisotropic etching. In this process the shape of the features etched are dictated by the direction of the slower etching planes of the silicon wafer and in [100] silicon (the most common wafer orientation) this creates either square or rectangular ports with angled walls. The most common shape for a fluid connection is tubular. This mismatch in shape makes a zero or low dead volume connection very difficult. Making this type of seal mechanically robust is also difficult. One solution to these problems is to create ports on the edges of the micro-machined devices. These ports can be made by isotropic etching which can yield near circular ports or by anisotropic etching which can approximate a circular port. In both cases the walls of these ports are perpendicular to the edge surface. There are advantages to making connections to the edge of the wafer devices. The first advantage is that the connection on the edge of a device takes up virtually no space on the wafer, and so the size of the device can be reduced compared to the planar surface connection. This reduction in size could be 50% or more. However, with the fluidic connections being made to the edges of the devices, there is a need for means of sealing these connections.

The present invention satisfies the sealing need by providing a zero dead volume tube to surface seal, which can be effectively utilized for gases and liquids. Basically the seal involves the use of a ferrule which forms both a seal about a tube and a seal on the ferrule/device mating surface. The sealing apparatus is simple in that it includes a body which retains a portion of a micro-machined device, and which has an opening having a thread section; a ferrule having an opening in which a tube extends; and a threaded fitting adapted to be inserted in the threaded opening for compressing the ferrule about the tube and against an edge surface of the micro-machined device, thereby forming a zero dead volume tube-to-surface seal.

SUMMARY OF THE INVENTION

It is an object of the present invention to provide a seal for fluidic connections.

A further object of the invention is to provide a zero dead volume seal.

A further object of the invention is to provide a seal between a tube and a surface.

Another object of the invention is to provide a method for connecting a tube to a surface that creates a zero dead volume seal.

Another object of the invention is to provide a zero dead volume seal that can be used over a wide range of temperatures and can be helium leak tight, as well as chemically resistant.

Another object of the invention is to provide a method for sealing a tube to small micro-machined devices where dead volume and sizes are issues.

Another object of the invention is to provide a tube to surface seal which utilizes a ferrule which both seals around a tube and between the interface of the ferrule and a surface of a device to which the tube is to be connected.

Other objects and advantages of the present invention will become apparent from the following description and accompanying drawings. The invention involves a method and apparatus for connecting a tube to a surface of a device that creates a zero dead volume seal. This sealing technique was developed primarily to make seals to ports created on the edges of fluidic devices fabricated by micro-machining silicon wafers. However, this technique could be used to make connections to the wafer surface, as well as the edges, of this type of device. It can also be useful to make seals to devices or systems fabricated using other technologies. The invention utilizes a body, a ferrule, and a fitting. The body functions to retain an edge of a wafer device, for example, and is provided with a partially threaded opening. The ferrule is located in the opening of the body and includes an opening therethrough into which a tube extends. The fitting is threaded to be screwed into the threaded opening of the body causing compression of the ferrule around the tube and contact between a mating surface of the device retained in the body and the ferrule producing a seal therebetween with an end of the tube in contact with either an edge surface of the device or a port formed on the edge surface. Thus, the invention results in a zero dead volume tube to surface seal for gases and liquids.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The invention is directed to a method and apparatus for connecting a tube to a surface that creates a zero dead volume seal. More specifically, the invention is a technique for making a gas or liquid face seal to the surface of a device that has near zero dead volume. This sealing technique was developed primarily to make seals to ports created on the edges of fluidic devices fabricated by micro-machining silicon wafers, such as a micro-machined silicon wafer Capillary Gas Chromatograph (GC). However, this sealing technique could also be used to make connections to the wafer surface of this type of device.

The invention utilizes three basic components, a ferrule, a body, and a fitting. The ferrule is compressed onto a tube therein by the fitting creating a seal to the tube. The fitting also provides pressure on the ferrule that seals the face of the ferrule to a mating surface on a device retained in the body.

Figure 1:
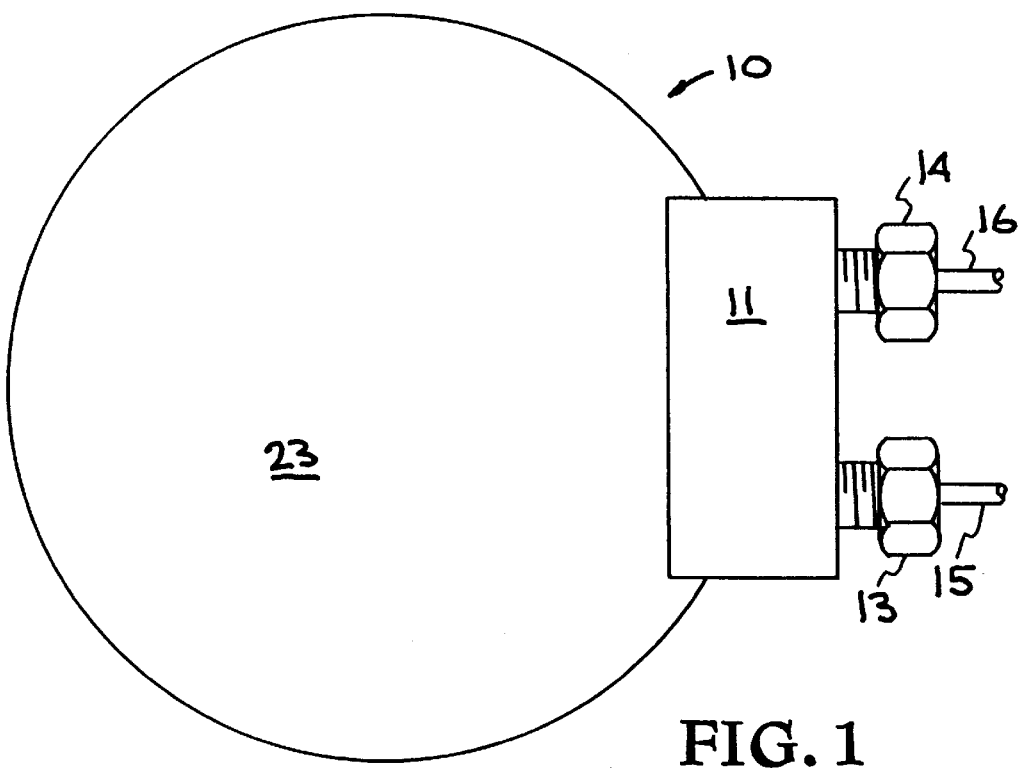
FIG. 1 is a top view of a micro-machined silicon wafer Capillary Gas Chromatograph (GC) incorporating the invention.
Figure 2:
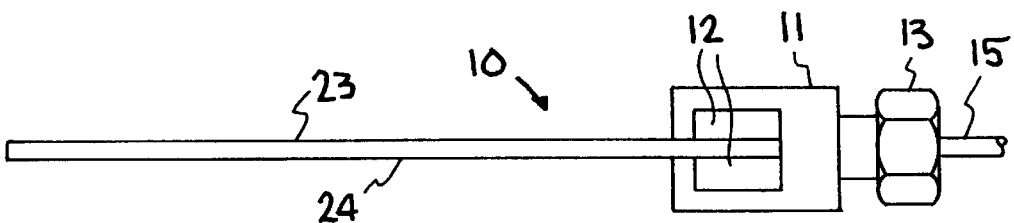
FIG. 2 is a side view of the FIG. 1 apparatus.

Referring now to the drawings, the invention is illustrated and described for use with a micro-machined silicon wafer Capillary Gas Chromatograph using a bonded pair of silicon GC wafers. As shown in FIGS. 1 and 2, a silicon wafer GC generally indicated at 10 is connected to a housing or body 11 via a pair of electrostatically bonded borosilicate glass members or rails 12, see FIG. 2. The GC 10 in this embodiment uses 3 inch diameter silicon wafers. A pair of fittings 13 and 14 are threadedly connected to housing or body 11, and through which tubes 15 and 16 extend, tube 15 being connected to a capillary input from an injector and tube 16 connected to a capillary output to a detector, as indicated by legends.

Figure 3:
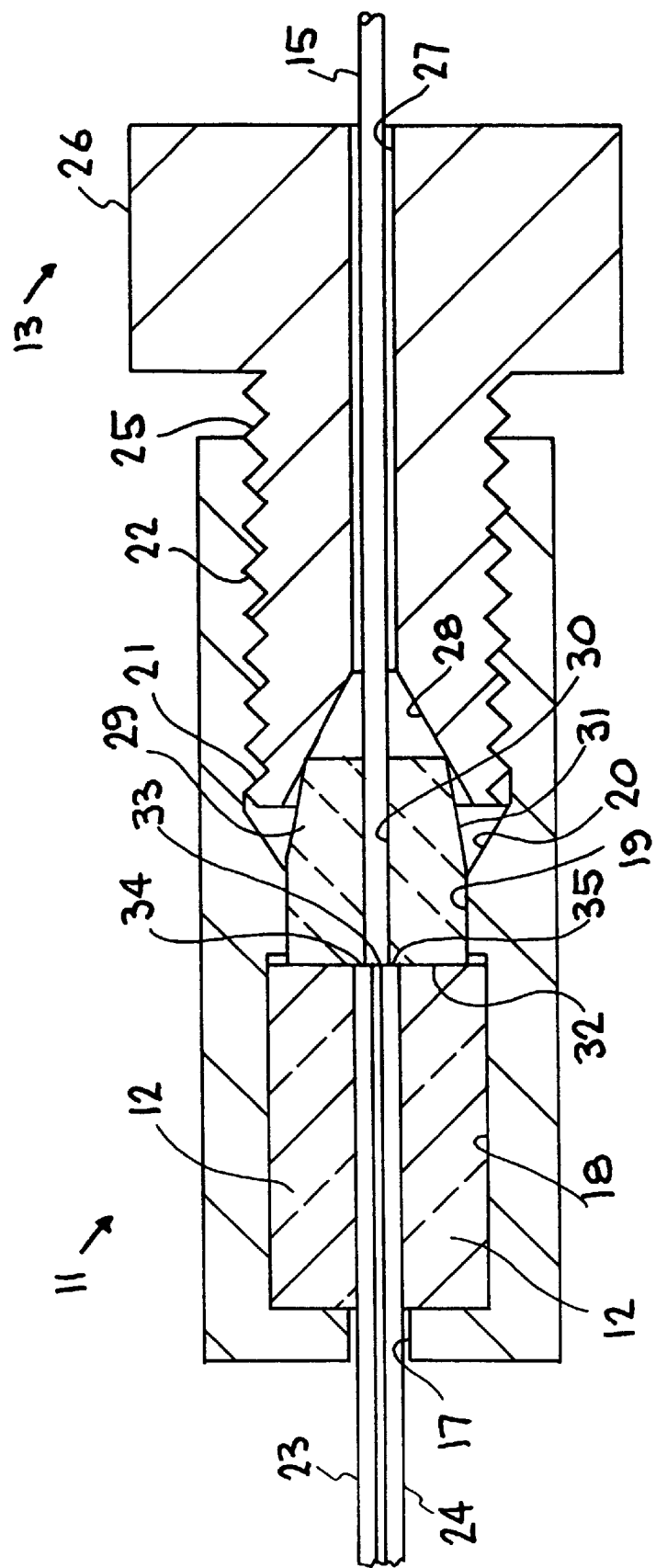
FIG. 3 is a partial enlarged cross-sectional view of an embodiment of an apparatus, shown in FIG. 2, and made in accordance with the invention.

FIG. 3 illustrates an embodiment of the seal forming apparatus of the present invention and is composed of housing or body 11 having an opening extending therethrough composed of sections 17, 18, 19, 20, and 21, with section 20 being of an outwardly tapering configuration and section 21 having threads 22. This embodiment of the GC 10 includes a bonded pair of silicon wafers 23 and 24 which extend through body opening sections 17 and 18, with the borosilicate glass rails being located in opening section 18 on opposite sides of said silicon wafers 23 and 24. Fitting 13, for example, is composed of a threaded section 25 adapted to cooperate with threads 22 of body 11, and an enlarged flange or nut section 26, with a centrally located opening 27 extending therethrough and having an inner outwardly tapering section 28. A guard column or tube 15 extends through opening 27 in fitting 13, and may be composed of glass or stainless steel. A ferrule 29 having an opening 30, a tapered outer surface 31, and a face section 32 is located in opening sections 19 and 20 of body 11 and in tapered section 28 of opening 27 in fitting 13, with an inner end 33 of tube 15 being positioned in opening 30 of ferrule 29. The ferrule 29 may be composed of vespel graphite, for example.

In operation, with the pair of bonded silicon wafers secured in opening sections 17 and 18 of body 11, and with the ferrule 29 located in opening sections 19 and 20 of body 11, and the tube 15 extending into the opening 30 of ferrule 29, and outwardly through opening 27 in fitting 13, the fitting 13 is rotated or screwed inwardly via threads 22 and threaded section 25 to a position as shown in FIG. 3, whereby the ferrule 29 is compressed due to relative movement of the tapered surfaces 28 and 31 of fitting 13 and the ferrule 29 and forms a seal around tube 15, as seen in FIG. 3; and inward turning or screwing of fitting 13 forces the face 32 a ferrule 29 against edges 34 and 35 of silicon wafers 23 and 24, causing a seal therebetween, as shown in FIG. 3. The edges 34 and 35 may form, for example, define ports in the silicon wafers 23 and 24. Note, as shown in FIG. 3, with the fitting 13 tightened in body 11, the inner end 33 of tube 15 is in contact with the surfaces 34 and 35 of wafers 23 and 24, thereby providing for fluidic flow therebetween. However, if the inner end 33 of tube 15 is slightly withdrawn from the face 32 of ferrule 29, a seal is maintained and fluid flow is provided by the opening 30 in ferrule 29.

By way of example, the body 11 may be composed of stainless steel or other metal or plastic depending on the application; the fitting 13 composed of stainless steel or other suitable metal or plastic; the ferrule 29 composed of vespel graphite or Teflon with the tapered surface 31 of ferrule 29 tapering at an angle of 8° to 20°, and with the tapering section 28 of opening 27 in fitting 13 having a taper of 20° to 30°. In addition to the rails 12 being composed of borosilicate glass, for bonding to silicon, they may be composed of metal or plastic depending on the materials to which they are bonded. The size of the openings in the housing or body 11 and the openings in fitting 13 and ferrule 29 will depend on the size of the micro-machined device (silicon GC wafers, for example) and the size of the tube 15, which in addition to glass or stainless steel can be composed of other metals or plastic. The composition of the materials and their size will be determined on the application for the tube to surface technique of this invention.

While the invention has been described with respect to silicon wafers of a GC, this type of seal could be used anywhere a zero dead volume surface to tube seal is required. This type of seal could be used extensively in gas and liquid analytical systems. With the appropriate choice of materials the sealing apparatus can be used to form a chemically resistant or high temperature seal. Tests have shown that the sealing apparatus can be used over a wide temperature range and has the capability of being helium leak tight. Also, while the sealing technique of this invention is particularly useful for sealing to small micro-machined devices, it can be utilized wherever dead volume and size are issues.

It has thus been shown the present invention provides a tube to surface seal and which is particularly effective for zero dead volume applications such as in micro-machined devices. The sealing technique of this invention can be utilized over a wide range of temperatures and can be chemically resistant, by selecting the composition of the components, particularly the ferrule.

While a particular embodiment has been illustrated for carrying out the sealing technique of this invention, and specific materials and parameters have been set forth to exemplify and describe the principles of the invention, such are not intended to be limiting. Modifications and changes may become apparent to those skilled in the art and it is intended that the invention be limited only by the scope of the appended claims.

The invention claimed is:

1. A method or connecting a tube to a surface that creates a zero dead volume seal, comprising:

providing a body, retaining in said body a device having a surface thereon by using a body having an opening therethrough, and using members located in the opening and on opposite sides of the device, positioning a tube in a ferrule, positioning the ferrule in the body, compressing the ferrule around the tube to form a seal therebetween, and positioning and retaining a face of the ferrule against the surface of the device to form a seal therebetween.

2. The method of claim 1, additionally including forming the members from borosilicate glass.

3. The method of claim 2, additionally including forming the device to be retained in the body by micro-machining.

4. The method of claim 3, wherein the micro-machined device comprises bonded silicon wafers of a gas chromatography system.

5. The method of claim 1, wherein positioning the tube in the ferrule is carried out by forming an opening in the ferrule, and inserting the tube into said opening such that an end thereof is adjacent the face of the ferrule.

6. The method of claim 1, wherein compressing the ferrule around the tube is carried out by positioning the ferrule in the opening of the body, and inserting a fitting into the opening of the body causing compression of the ferrule.

7. The method of claim 6, wherein positioning and retaining the face of the ferrule against the surface of the device retained in said body, is carried out by removably inserting the fitting into the opening in the body whereby the face of the ferrule is retained against the surface of the body.

8. The method of claim 7, additionally including providing a section of the opening of the body and a section of the fitting with cooperating threads, such that the fitting can be removably inserted into the opening of the body.

9. The method of claim 8, additionally including forming an opening in the fitting such that an inner end thereof is of a tapered configuration, and forming a tapered outer surface on the ferrule such that the tapered surfaces cooperate to compress the ferrule around the tube and to position the face of the ferrule in contact with the surface of the device for creating the seal therebetween.

10. Apparatus for producing a zero dead volume tube to surface seal comprising:
    a housing having an opening extending therethrough,
    means positioned in a section of said opening in said housing adapted for retaining an associated surface to be sealed,
    a ferrule having an opening therein positioned in another section of said opening in said housing and adapted to retain in said opening of said ferrule an associated tube to be therein,
    a fitting removably positioned in another section of said opening in said housing adapted to compress the ferrule about an associated tube for forming a seal therebetween, and adapted to force a face of said ferrule against an associated surface for forming a seal therebetween,
    whereby a tube to surface seal having zero dead volume is formed,
    said means in the first-mentioned section of said opening in said housing comprising a pair of borosilicate glass rails adapted to be bonded to a device having a surface to be sealed.

11. The apparatus of claim 10, wherein said fitting and said section of said opening in said housing in which said fitting is removably positioned include a cooperating threaded section.

12. The apparatus of claim 11 wherein said fitting has an opening extending therethrough which includes a tapered inner section, and wherein said ferrule has a tapered outer section adapted to cooperate with said tapered inner section of said opening in said fitting, whereby inward movement of said fitting causes compression of said ferrule and forces said ferrule against an associated surface retained in said housing.

13. The apparatus of claim 10, wherein said housing retains a bonded pair of silicon gas chromatography wafers having a surface thereon to be sealed to a tube, and wherein a tube to be sealed to said surface is positioned in said opening in said ferrule,
    whereby movement of said fitting into said opening in said housing causes compression of said ferrule about said tube forming a seal therebetween and causes the face of said ferrule to contact said surface of said bonded pair of silicon wafers forming a seal therebetween.

14. The apparatus of claim 10, wherein said opening in said housing includes five sections of different cross-sections, a first of said five sections being tapered, a second of said five sections being threaded, said ferrule being located primarily in said tapered section and a third of said five sections, a fourth section and a fifth section of said five sections of said opening in said housing being adapted to retain a device having a surface to be sealed.

* * * * *